UNITED STATES PATENT OFFICE 2,520,737

PROCESS OF JOINING THICK SHEETS OF POLYETHYLENE

Hendrik Romeyn, Jr., Nutley, and Wesley Ferrell, Fair Lawn, N. J., assignors to United States Rubber Company, New York, N. Y., a corporation of New Jersey No Drawing. Application January 14, 1948, Serial No. 2,325

5 Claims. (Cl. 154—116)

This invention relates to a process of joining sheets of polyethylene whereby excellent joints are produced in a simple and economical manner.

Polyethylene or polymerized ethylene is a well-known plastic material having excellent electric, moisture and chemical resistant properties. As is well-known, polyethylene is a resinous polymer made by polymerizing ethylene to a molecular weight of 18,000 to 30,000. Polyethylene, unlike most other thermoplastics, has a sharp melting point and this sharpness of melting point is believed to be one reason for the great difficulty of joining sheets by heat-sealing. By reason of the insoluble nature of polyethylene, no satisfactory method for cementing the plastic has been found. Thin films of polyethylene can be heat-sealed for applications in packaging when the films are not more than a few thousandths of an inch thick. Such films have been heat sealed by rapid contact with a heated metal element but this method cannot successfully be applied to sheets more than a few thousandths of an inch thick because in such a method heat is applied from only one side, and since there is no control of temperature and pressure there is either inadequate flow or too much flow with the result that a satisfactory joint is not obtained. In order to joint thicker sheets of polyethylene such as might be used in the fabrication of large containers for liquids, efforts have been made in the past to use special techniques such as flame welding using a plasticized polyethylene as the welding material but this is not satisfactory because the method is sensitive and very difficult to control. Such a method requires the services of a highly trained technician to produce a fair joint but such a method is not adaptable to large scale production. So far as we are aware, no simple and satisfactory method of joining sheets of polyethylene thicker than a few thousandths of an inch has been developed prior to the present invention. The previous impossibility of satisfactorily joining sheets of polyethylene of substantial thickness has greatly limited its application in industry.

The present invention provides a simple, novel and highly useful method for joining polyethylene sheets which may vary in thickness from films a few thousandths of an inch thick up to sheets as thick as ¼" or even thicker. In fact the present invention can even be employed to satisfactorily join sheets of polyethylene as thick as 1".

We have discovered that sheets of polyethylene may be joined very satisfactorily by lapping the sheets and heating the material at the interface to a temperature of not less than 5° C. below and not more than 15° C. above the melting point of the polyethylene while subjecting the lap joint to mechanical pressure. The melting point of the polyethylene is defined as the temperature at which the crystalline phase disappears as determined by X-ray diffraction pattern.

The temperature employed in practicing the present invention is very critical. For commercially available polyethylene having a molecular weight of about 20,000 and a melting point of about 115° C., the temperature for successful operation of our invention should not be below 110 C. and should not be above 130° C. If it is attempted to use temperatures more than 5° C. below the melting point the material does not flow together and a good joint is not produced. If, on the other hand, the temperature is more than 15° C. above the melting point, the polyethylene is too fluid and flows excessively so that a good joint is not produced. With commercially available polyethylene in sheet form, we find it very convenient to operate at temperatures in the neighborhood of 125° C.

The material being joined must be confined between platens and subjected to positive mechanical pressure while it is heated to the temperature described above. Since the material will flow under pressure, it is highly preferred to provide means for limiting the flow. Thus we prefer to apply pressure at the lap joint in such a way that the material flows to such an extent that the thickness of the resulting joint will be less than the sum of the thicknesses of the two sheets and will be at least equal to the thickness of either of the sheets. While usually the sheets will be of the same thickness, if they are of different thickness, the thickness of the resulting joint should be at least equal to the thickness of the thinner sheet.

Various ways of controlling the flow of the material during the formation of the joint may be employed. One way is to limit the distance through which the pressure can act. For example, spacers may be placed between the platens used to exert the pressure on the joint, said spacers being of a thickness at least as great as that of the individual sheet and less than that of the combined sheets. Thus in the case of a joint between two sheets each 0.080" thick, spacers 0.125" thick between the pressure plates will limit the flow at the splice to give a splice 0.125" thick in a sheet 0.080" thick.

The heating of the sheets of polyethylene is almost invariably accomplished by the use of heated platens which may be heated in any suitable way and which are pressed together mechanically during the formation of the joint, thereby simultaneously applying heat and the necessary pressure to the interface.

The length of time of heating the assembly at the temperature indicated above is determined by the thickness of the material. We have found that the time of heating should be that defined by the equation $T=KD$ where K is a constant greater that 15 and less than 30, where D is the sum of the thicknesses in inches of the two sheets and where T is the time in minutes. We prefer, particularly in the case of commercially available polyethylene sheets, to employ a time defined by the foregoing equation where K is from 18 to 20.

The minimum time given by the above equation represents the shortest time needed for satisfactory joining of the material. A shorter time than this will result in incomplete joining and mechanical weakness. A longer period of heating than the maximum given by the above equation does not further improve the quality of the joint and increases the danger that mechanical weakness may develop due to uneven flow or bubbling which take place if the material is allowed to flow out to such an extent that it is no longer under positive pressure at the joint. In our method, however, the material is under a positive pressure at the joint during the entire joining operation.

At the end of the heating cycle the length of which is defined by the equation given above, we prefer to quench the joint by lowering its temperature quickly to 70° C. and more preferably to less than 50° C., say to room temperature. This quenching prevents excessive flow of material at the joint and also eliminates distortion of the joint upon removal of the platens. Quenching of the joint may be effected in any convenient manner but is preferably carried out by cooling the platens, for example by passing a cooling medium therethrough.

The rapidity of the cooling may vary widely but it is preferred to carry out the cooling in a period of time of not over 10 minutes. In practice the cooling is effected as quickly as possible.

*Example 1*

Two sheets of commercial polyethylene, each 0.080 inch thick, were lapped over one another with a 1 inch overlap. The assembly was placed between two platens previously heated to 125° C. Spacers 0.125 inch thick were placed between the platens on each side of the joint in order to control the thickness of material at the joint. The platens were then closed with a pressure corresponding to 125 lbs./sq. in. of joint. After 3.0 minutes the platens were cooled to 12° C. and the joined sheet was removed. The joint so made was 0.125" thick, in a sheet 0.080" thick; when the joint was tested in a tensile test machine, it elongated greatly before finally breaking, indicating that the strength of the bond exceeded the yield strength of the material.

*Example 2*

Example 1 was duplicated except that sheets of polyethylene 0.020" thick were used, the time of the heating cycle was 0.75 minutes and the spacers were 0.030" thick. The resulting joint was 0.030" thick in a sheet 0.020" thick and was in every respect similar to the joint obtained in Example 1.

From the foregoing it will be seen that our invention provides a practical commercial method of fabricating articles from sheets of polyethylene, particularly sheets of substantial thickness, i. e., at least 0.01 inch up to any desired thickness. Our method is applicable in the manufacture of large articles of all types made from polyethylene such as containers useful for the transportation and storage of corrosive chemical liquids, etc. The joint produced by our invention is completely homogeneous and integral. It has been demonstrated that the strength of the joint produced is greater than the yield strength of the polyethylene sheet.

Where reference is made herein to joining of sheets we intend to include joining both separate sheets, joining two edges of the same sheet as in forming a tube and the joining of two edges of sheets which are in the form of cylinders or tubes. For example, using our invention, a sheet of polyethylene may be formed into a cylinder and a longitudinal joint formed therein; two such cylindrical forms may be joined together by lapping them telescopically and applying our invention.

Having thus described our invention, what we claim and desire to protect by Letters Patent is:

1. The method of joining two edges of sheet material consisting of polyethylene, said material having a thickness of at least 0.01 inch, which comprises lapping said edges, heating the material at the interface of the overlap to a temperature of not less than 5° C. below and not more than 15° C. above the melting point of the polyethylene and, throughout said heating, confining and subjecting to positive pressure the material at the overlap until an integral joint is formed, subsequently cooling said joint, and continuing said confining step and the application of said pressure until said joint has been cooled to a temperature at least 5° C. below said melting point.

2. The method of claim 1 including the step of so limiting the flow of the material during said heating and confining steps that the thickness of the resulting joint is less than the initial combined thickness of the lapped edges but is at least equal to the least thickness of either of said edges.

3. The method of claim 1 wherein said pressure is exerted by platens and wherein the flow of the material during the heating and confining steps is limited by limiting the distance through which said pressure can act by placing spacers between the platens, said spacers being of a thickness such that the smallest clearance between the platens is less than the sum of the initial combined thickness of the lapped edges but at least equal to the least thickness of either of said edges.

4. The method of claim 1 wherein said joint is cooled down to a temperature at least as low as 70° C. in a period of time of not over ten minutes.

5. The method of joining two edges of sheet material consisting of polyethylene having a melting point of approximately 115° C., said material having a thickness of at least 0.01 inch, which comprises lapping said edges, heating the material at the interface of the overlap to a temperature of not less than 110° C. and not over 130° C. and, throughout said heating, confining and subjecting to positive pressure the material at the overlap until an integral joint is formed, subsequently cooling said joint, and continuing said confining step and the application of said pressure until said joint has been cooled to a temperature below 110° C.

HENDRICK ROMEYN, Jr.
WESLEY FERRELL.

REFERENCES CITED

The following references are of record in the file of this patent:

UNITED STATES PATENTS

| Number | Name | Date |
|---|---|---|
| 2,219,700 | Perrin et al. | Oct. 29, 1940 |
| 2,419,387 | Bierer | Apr. 22, 1947 |
| 2,441,940 | Rohdin | May 18, 1948 |
| 2,466,643 | Magid | Apr. 5, 1949 |
| 2,478,121 | Morner | Aug. 2, 1949 |
| 2,488,212 | Lloyd | Nov. 15, 1949 |

FOREIGN PATENTS

| Number | Country | Date |
|---|---|---|
| 491,804 | Great Britain | Sept. 8, 1938 |
| 555,054 | Great Britain | Aug. 3, 1943 |

OTHER REFERENCES

"Polythene, Physical and Chemical Properties," by Hahn et al., Industrial and Engineering Chemistry pp. 526–533, June 1945.

"Polyethylene," by C. S. Myers, "Modern Plastics," Aug. 1944, pages 103–107, 174, 176.